C. J. BRISTOL.
TRACTOR ATTACHMENT FOR AUTOMOBILES.
APPLICATION FILED AUG. 22, 1916.

1,205,430.

Patented Nov. 21, 1916.
3 SHEETS—SHEET 1.

witness.
G. F. Jurechek.

Inventor
Cyrus J. Bristol
By Orwig + Bair
Attys.

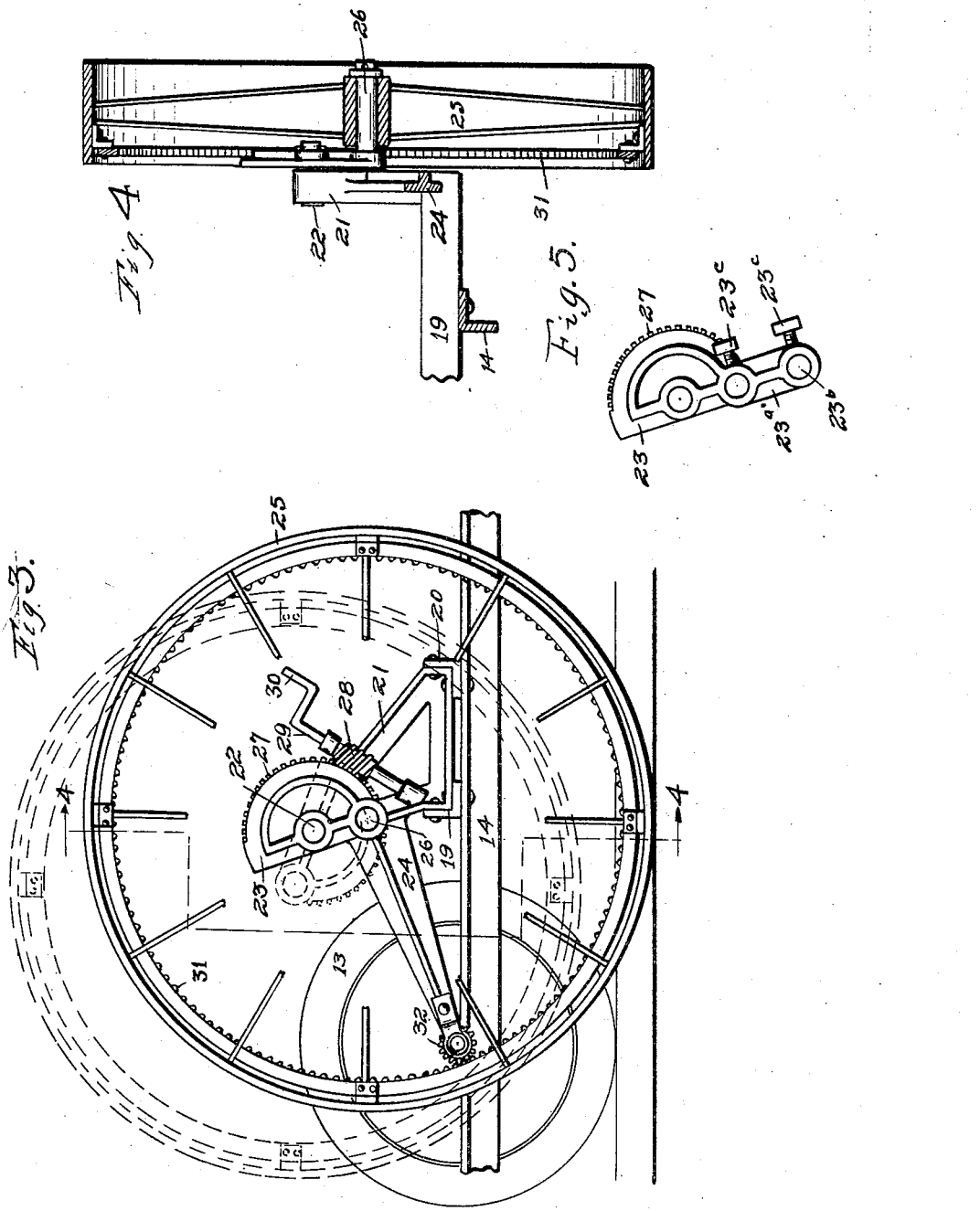

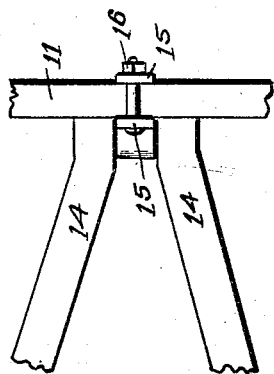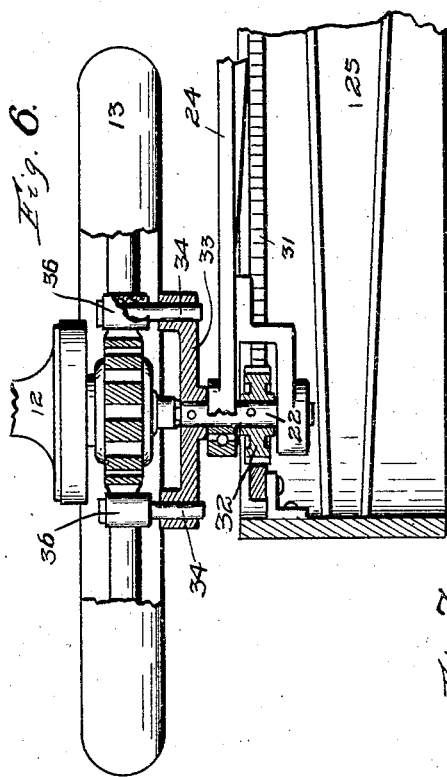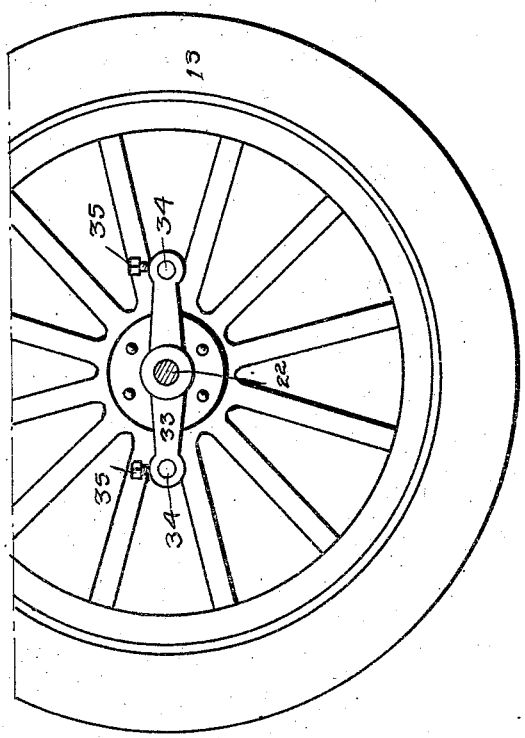

UNITED STATES PATENT OFFICE.

CYRUS J. BRISTOL, OF DES MOINES, IOWA, ASSIGNOR OF ONE-HALF TO FRED W. SWANSON, OF DES MOINES, IOWA.

TRACTOR ATTACHMENT FOR AUTOMOBILES.

1,205,430.  Specification of Letters Patent.  Patented Nov. 21, 1916.

Application filed August 22, 1916. Serial No. 116,217.

*To all whom it may concern:*

Be it known that I, CYRUS J. BRISTOL, a citizen of the United States, and resident of Des Moines, in the county of Polk and State of Iowa, have invented a certain new and useful Tractor Attachment for Automobiles, of which the following is a specification.

The objects of my invention are to provide a tractor device of simple, durable and inexpensive construction, capable of being quickly and easily applied to an automobile without removing any of the parts of the automobile, whereby all of the operative parts of the automobile may be utilized to perform their ordinary functions as applied to a tractor and especially adapted for use for farm purposes.

A further object is to provide a tractor attachment of this class whereby the tractor wheels may be readily, quickly and easily elevated to thereby permit the engagement of the automobile wheels with the road, or the tractor wheels may be readily, quickly and easily lowered to thereby elevate the automobile wheels from the road surface and to support the rear of the automobile wholly upon the tractor wheels.

A further object is to provide improved means for readily, quickly and easily connecting the gearing mechanism of the tractor wheels with the rear or driving wheels of an automobile without the necessity of removing the wheels or even the hub caps thereof.

A further object is to provide improved means whereby either one of the tractor wheels may be lowered relative to the other, whereby the tractor may be advanced over a field with one traction wheel in a furrow and at the same time may retain the automobile body in a substantially horizontal position.

Figure 1:
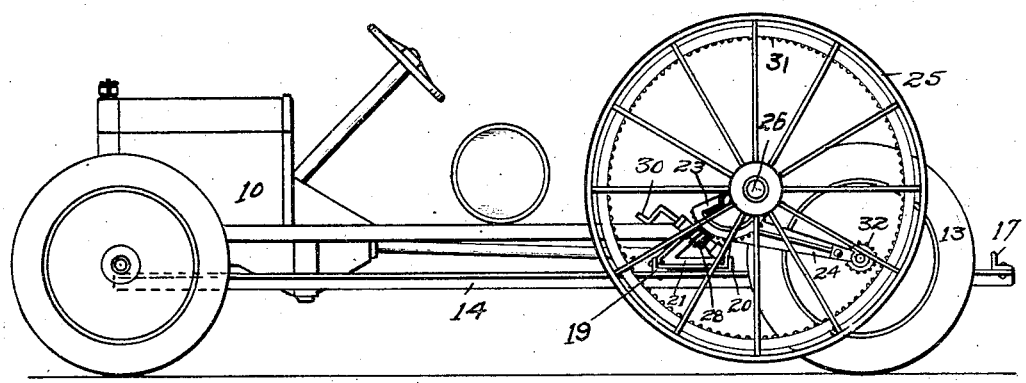
Figure 2:
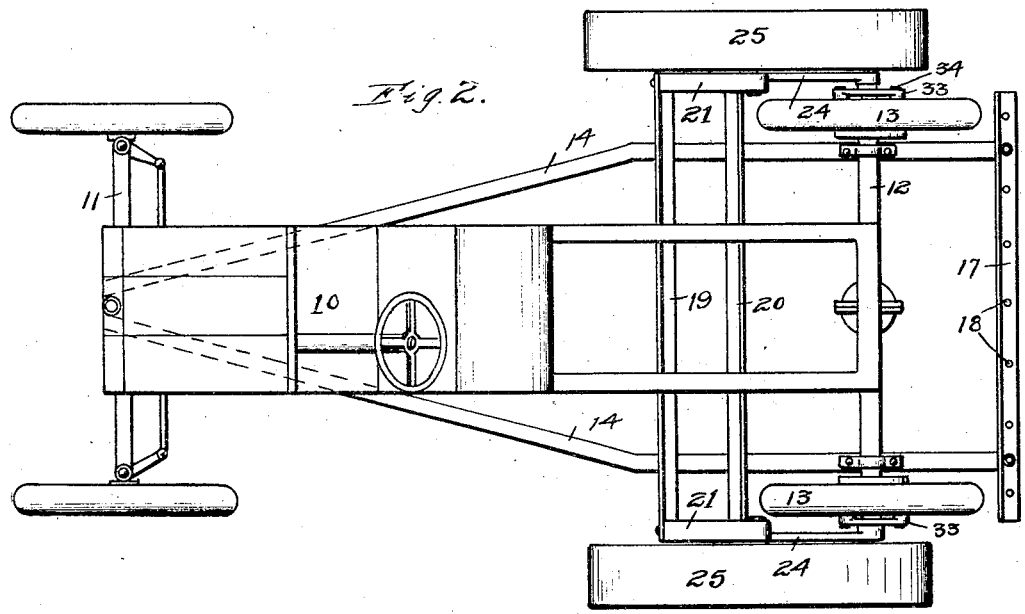

My invention consists in the construction, arrangement and combination of the several parts of the tractor device, whereby the objects contemplated are attained, as hereinafter more fully set forth, pointed out in my claims, and illustrated in the accompanying drawings, in which:

Figure 1 shows a side elevation of an automobile having my improved tractor device applied thereto and showing the tractor device elevated above the road surface and supported wholly upon the automobile. Fig. 2 shows a top or plan view of same. Fig. 3 shows a side elevation of a part of my improved tractor device, illustrating part of the tractor frame and one of the tractor wheels and the means for raising or lowering the tractor wheel relative to the automobile wheels. The dotted lines in said figure indicate the position of the tractor wheel when it is elevated to position for carrying the weight of the tractor wholly upon the automobile wheels. Fig. 4 shows a detail, sectional view illustrating a part of the tractor frame and one of the tractor wheels, taken on the line 4—4 of Fig. 3. Fig. 5 shows a detail view of the lever with the sector applied thereto for carrying the tractor wheel, and illustrating two bearings for the tractor wheel axle, whereby the tractor wheel may be adjusted vertically relative to the frame to two different positions. Fig. 6 shows an enlarged detail view partly in section, illustrating the means for connecting the driving pinion of the tractor wheel with the rear automobile wheel. Fig. 7 shows a side view illustrating the same feature. Fig. 8 shows a detail view illustrating the means for connecting the tractor frame with the front axle of the automobile, and Fig 9 shows a side view of same with the axle in section.

Referring to the accompanying drawings, I have used the reference numeral 10 to indicate generally the automobile, 11 to indicate the front axle thereof, 12 the drive wheel axles, and 13 the rear drive wheels of the automobile.

My device is especially designed for use in connection with Ford automobiles, but obviously may readily and easily be designed for use in connection with any ordinary automobile.

In the specification and claims hereof, for purposes of convenience I will employ the term "rear automobile wheels" to designate the wheels that are ordinarily attached to the rear axles of the automobile, and the term "tractor wheels" to designate the large wheels of my attachment for the purpose of supporting the rear end of the automobile and driving the entire device.

My attachment consists of a frame 14, the front ends of which converge toward each other and are connected to the front axle of the automobile by means of the plates, 15 and bolts 16, as illustrated in Figs. 8 and 9. The rear end portions of the frame are connected by a cross piece 17 having openings 18 therein for convenience in attaching various farm implements when desired. There are two other cross pieces 19 and 20 fixed to the tractor frame and extended transversely thereof in front of the rear automobile wheels.

Each of the tractor wheels with its corresponding gearing and adjusting mechanism is like the other, so that one only will be herein specifically described. Mounted upon the frame cross pieces 19 and 20 is a bracket 21 carrying a short shaft 22 upon which is rotatably mounted a lever 23 which will be hereinafter more fully described. This bracket 21 also has an arm 24 formed on or fixed to it and extending downwardly and rearwardly. This arm is for the purpose of supporting the small driving pinion hereinafter more fully described. The tractor wheel itself is of the ordinary kind and is indicated generally by the numeral 25 and is mounted for rotation upon a short axle 26, which axle is mounted in the lever 23 below the pivotal point of said lever. This lever 23 is provided with a sector 27, which sector is engaged by a worm gear 28 mounted on a shaft 29 having suitable bearings carried by the bracket 21, whereby upon a manipulation of the crank 30 on the shaft 29 the sector may be rotated throughout approximately a half circle, the result of which will be to swing the traction wheel rearwardly and upwardly on the shaft 22 as a center, to the position indicated by dotted lines in Fig. 3. The engagement of the worm gear 28 with the sector 27 is such that the device is locked in any position of its adjustment so that when said tractor wheel is once elevated to said position, as shown by dotted lines in Fig. 3, it will be held in that position by the worm gear.

On the inner side of the tractor wheel is an internal toothed rim 31, and carried by the arm 24 is a pinion 32. This pinion has at its outer end portion a bracket 33 containing two sliding pins 34 normally held in position by set screws 35. These pins preferably are provided near their outer ends with sleeves 36 of rubber or other yielding material, and are intended when projected outwardly to enter between the spokes of the adjacent rear automobile wheel to thereby connect said automobile wheel with the pinion 32 for driving the latter. The arrangement of these parts is such that when the tractor wheel is moved to its position as shown by solid lines in Fig. 3, the pinion 32 will be in proper mesh with the internal gear rim 31, so that when the rear automobile wheel is rotated the said pinion 32 will rotate in unison with it and by reason of its engagement with the internal gear rim 31 it will drive the tractor wheel in the proper direction and at a speed greatly reduced relative to that of the rear automobile wheel.

In some instances it may be desirable to have one of the rear tractor wheels arranged in a plane lower than the other. For instance, when using the tractor device for plowing, one of the tractor wheels may run in the furrow and the other on the unplowed ground. It may therefore, at times be desirable to elevate one wheel above the other so that the automobile body may maintain a substantially level position under such circumstances. For this purpose I have provided an extension 23$^a$ on the lever 23, provided with an opening 23$^b$ to receive the tractor wheel axle 26. This extension is illustrated in Fig. 5, and obviously the axle 26 may be removed when desired, from one of the openings and placed in the other, in which event the tractor wheel will be raised or lowered relative to the tractor frame by this adjustment of the tractor wheel axle. Set screws 23$^c$ are provided for holding the axle in either of these positions.

In practical use my improved tractor device may be firmly clamped to the automobile frame and the sliding pins 34 may be inserted between the spokes of the rear automobile wheels, whereupon the device is ready for use.

Assuming that the tractor attachment has been placed on the automobile at a point distant from the place where it is desired to use the tractor, then the operator manipulates the cranks 30 in such a manner as to elevate the tractor wheels above the ground surface and to move them rearwardly to a point where the pinions 32 are out of mesh with the internal gear rims of the tractor wheels. Then the operator or others may comfortably seat themselves in the automobile seats and drive at ordinary automobile speeds to the place where the tractor is to be used. Then when the tractor is at the place where it is to be used, the operator simply manipulates the cranks 30 again to swing the tractor wheels forwardly and downwardly, and in doing so the rear end of the automobile and the automobile rear wheels are elevated out of contact with the ground and the whole weight of the rear end of the automobile is carried by the tractor wheels. This is all the adjustment that need be made to adapt the device for use as a tractor.

In connection with Ford automobiles, I have observed that the engine works at its maximum efficiency when the automobile is running at approximately twenty-five miles an hour, and I have further observed that a tractor of this kind should ordinarily work for farm purposes at a speed of slightly over two miles an hour. I have, therefore, arranged the gearing between the rear automobile wheels and the tractor wheels so that when the automobile engine is running at about twenty-five miles an hour the tractor wheels will be advanced at slightly more than two miles an hour. By means of this arrangement it is obvious that when the tractor device is being advanced at the ordinary working speed of slightly more than two miles an hour, the automobile is running on what is ordinarily known as "high gear" and at its maximum efficiency. It should be remembered in this connection that in the event that an unusually heavy load is applied to the tractor, the operator of the automobile may, when desired, employ the low gear of the automobile, which would permit the engine to run at its maximum efficiency and yet drive the tractor wheels at a very slow rate. It is not desirable, however, that the low gear of the automobile should be employed for traction purposes to any great extent on account of excessive wear that would be applied to the low gear parts.

In the accompanying illustration and the foregoing specification I have shown and described the best means I have yet devised for carrying out the objects of my invention, and I do not desire to be understood as limiting myself to the specific structural details of either the driving mechanism for the rear tractor wheels or the means for raising and lowering the tractor wheels relative to the automobile frame.

I claim as my invention:

1. The combination with an automobile, of a pair of tractor wheels, means for establishing a driving connection between the said tractor wheels and the driving elements of the automobile, and means for raising or lowering the tractor wheels relative to the automobile frame for bringing either the tractor wheels or the automobile wheels into supporting position on the road surface.

2. The combination with an automobile, of a pair of tractor wheels, means for establishing a driving connection between the said tractor wheels and the driving elements of the automobile, and means for raising or lowering the tractor wheels relative to the automobile frame for bringing either the tractor wheels or the autombile wheels into supporting position on the road surface, and also at the same time for establishing or disconnecting the driving connections with the tractor wheels.

3. The combination with an automobile, of a pair of tractor wheels, means for establishing driving connections between the tractor wheels and the driving elements of the automobile, and means for raising and lowering the tractor wheels relative to the automobile rear wheels, said means being arranged to operatively disconnect the driving connections for the traction wheels when the traction wheels are elevated, and to operatively connect same when the traction wheels are lowered.

4. The combination with an automobile, of a pair of traction wheels, a gearing device for each traction wheel, capable of being operatively connected with the driving mechanism for the corresponding automobile wheel, and means operatively connected with each traction wheel for raising and lowering it relative to the corresponding automobile rear wheel, said means being so arranged that when the traction wheel is elevated the gearing connection between it and the corresponding driving element of the automobile will be disconnected, and when the traction wheel is lowered the said gearing connection will be established.

5. The combination with an automobile, of a tractor device including two tractor wheels, a driving shaft for each tractor wheel, means for detachably connecting each of said driving shafts with a corresponding rear automobile wheel, and a gearing device for connecting each of said driving shafts with the corresponding tractor wheel.

6. The combination with an automobile, of a tractor device including two tractor wheels, a driving shaft for each tractor wheel, a bracket carried by said driving shaft, a means carried by the bracket for engaging with the spokes of the corresponding rear automobile wheel, and gearing devices for connecting said shafts with the tractor wheels.

7. The combination with an automobile, of a tractor device including two tractor wheels, a lever for each tractor wheel carried by the tractor frame and having a corresponding tractor wheel mounted thereon, a sector on said lever, a worm in mesh with the sector for operating the lever from a position in which the corresponding tractor wheel is in engagement with the ground to a position where it is elevated from the ground and the device is supported on the rear automobile wheel and whereby the said levers are secured or locked in any of the positions of their adjustment, and gearing devices interposed between the driving members of the automobile and the said tractor wheels.

8. The combination with an automobile, of a tractor device including two tractor wheels, a lever for each tractor wheel carried by the tractor frame and having a corresponding tractor wheel mounted thereon, a sector on said lever, a worm in mesh with the sector for operating the lever from a position in which the corresponding tractor wheel is in engagement with the ground to a position where it is elevated from the ground and the device is supported on the rear automobile wheel and whereby the said levers are secured or locked in any of the positions of their adjustment, said levers being provided with more than one bearing or support for the axles of the tractor wheels, whereby either tractor wheel may be adjusted to different positions relative to the pivotal center of the lever, and gearing devices interposed between the driving members of the automobile and the said tractor wheels.

9. The combination with an automobile, of a tractor device comprising a frame, brackets carried by the frame, levers fulcrumed to said brackets, a sector on each lever, a tractor wheel mounted upon each lever, a worm gear carried by the frame and in mesh with each of said sectors, an arm on the tractor frame extended downwardly and rearwardly, a pinion mounted in said arm, means carried by the pinion for engagement with the spokes of the rear automobile wheels, and internal gear rims carried by the tractor wheels, said parts being so arranged that when the tractor wheels are in one position of their adjustment the said pinions will be in mesh with the internal gear rims, and when the said worms are manipulated the tractor wheels will move rearwardly and upwardly out of engagement with the said pinions and to positions where the weight of the rear end of the automobile and the tractor device will be carried by the rear automobile wheels, for the purposes stated.

Des Moines, Iowa, August 17, 1916.

CYRUS J. BRISTOL.